C. A. ZWEIBEL & L. E. ATWELL.
BRAKE BEAM HANGER.
APPLICATION FILED DEC. 14, 1917.
1,287,566.
Patented Dec. 10, 1918.
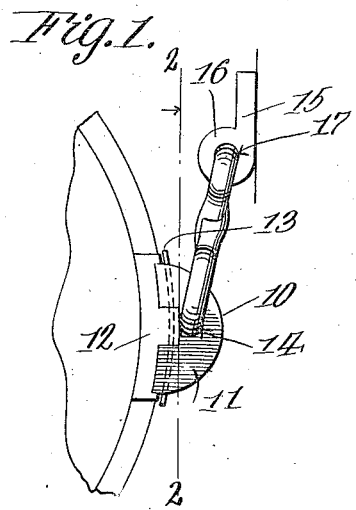
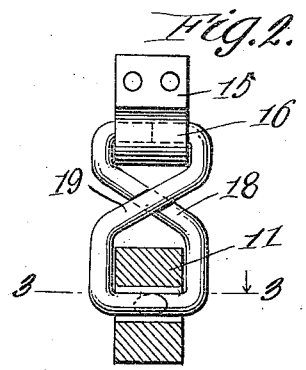
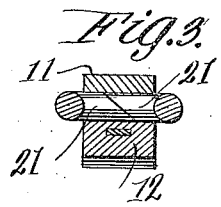
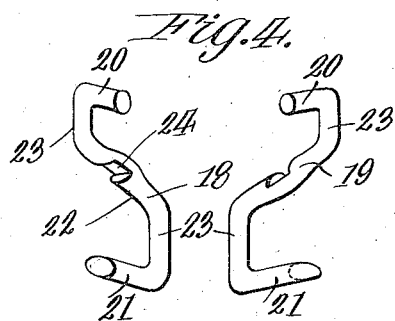
INVENTOR
Charles A. Zweibel
Lewis E. Atwell
WITNESSES
BY
ATTORNEY

UNITED STATES PATENT OFFICE.

CHARLES A. ZWEIBEL AND LEWIS E. ATWELL, OF WILMINGTON, NORTH CAROLINA.

BRAKE-BEAM HANGER.

1,287,566.   Specification of Letters Patent.   Patented Dec. 10, 1918.

Application filed December 14, 1917. Serial No. 207,168.

*To all whom it may concern:*

Be it known that we, CHARLES A. ZWEIBEL and LEWIS E. ATWELL, citizens of the United States, residing at Wilmington, in the county of New Hanover and State of North Carolina, have invented certain new and useful Improvements in Brake-Beam Hangers, of which the following is a specification.

This invention has relation to brake hangers for railway car brakes, and has for an object to provide a hanger formed of a single piece of material, which may be used singly or in pairs to support the brake head and brake shoe without the use of bolts, cotter pins, wedges, or the like.

Another object of the invention is to provide a brake hanger formed of a single piece of material and constructed in a manner to permit its association with the brake head and bolster so as to support the brake head without the possibility of becoming disconnected from the bolster or other supporting member, without the use of bolts, wedges, or other fastening means.

A still further object of the invention is to provide a hanger for brake heads which is composed of a single piece of material including corresponding or parallel members designed to enter the brake head and bolster lug, and a connecting member for said corresponding members, said connecting member being arranged in a manner to preclude disengagement of the brake heads from the hanger without the use of bolts, cotter pins or other fastenings.

A still further object of the invention is to provide a brake hanger including a pair of substantially Z-shaped members to be associated in interlocking engagement whereby to define corresponding members to enter the brake heads for oscillatory movement in the usual manner but to prevent disengagement of the brake heads, without the use of bolts, cotter pins, or other fastening means.

A still further object of the invention is to provide a brake hanger having the characteristics above set forth which may be manufactured at reduced cost and without the use of special machinery.

In addition to the foregoing our invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a view in side elevation of our improved brake hanger illustrating its association with the brake head and the bolster supporting lug therefor.

Fig. 2, is a view in front elevation thereof with the brake head in section.

Fig. 3, is a detail view in section taken on line 3—3 of the preceding figure.

Fig. 4, is a view in perspective of the parts of the brake hanger in disassociated relation.

With reference to the drawings, particularly Figs. 1 to 3, 10 indicates generally the structure supported by the brake hanger comprising the brake heads 11 and brake shoe 12, constructed for interfitting engagement with a key 13 provided to retain the parts in locked relation. The brake head 11 is formed on its inner surface with a semicircular recess 14 entering the brake head transversely. This is a conventional form of brake head, and hence forms no part of our invention. Mounted upon the bolster of the rolling stock is what may be termed the bolster lug 15 having an enlargement 16 apertured transversely as at 17 with an opening which is parallel to the opening 14 of the brake head. This bolster lug may be formed separately or constitute a part of the bolster of the rolling stock, and in the standard construction a bolt is entered into the enlargement of the bolster lug to support a U-shaped member which in turn is inserted at its bight portion through the brake head, the bolt being subsequently held in place by means of a cotter pin or wedge or the like. This is the standard car construction, and is disadvantageous, in that the cotter wedge, or other fastening means is subject to breakage, likewise the bolt, and U-shaped hanger, thereby permitting separation of the parts whereby the brake head is permitted to fall upon the rails either derailing the car or otherwise causing disaster by the elimination of the brake heads and the consequent inability of the braking members to effect stoppage of the car. It is therefore our object to provide a hanger for supporting the brake heads from the bolster lug which hanger is of an improved construction, whereby the use of wedges, bolts or other fastening means is obviated and whereby the brake head is supported in a manner to permit oscillation toward and from the wheels, but which is held against sidewise movement and separation from the hanger.

To this end we have provided a pair of sections 18, and 19, duplicates in construction and hence interchangeable, each being substantially Z-shaped. Each section includes a pair of corresponding, or preferably parallel members 20 and 21, the remote ends of which are connected by the connecting member 22 disposed diagonally relative to said corresponding members. The terminals of the diagonal member 22 are formed with parallel portions 23 which are integrally connected with the corresponding members 20 and 21, although the provision of the parallel portion 23 is not necessary as will be subsequently noted. The diagonal portions 23 are furthermore formed upon lateral faces with cutaway portions 24, and the material around said cut away portions may be increased to prevent weakening of the hanger at these points.

In associating the parts the diagonal members 22 are disposed in crossed relation as shown in Fig. 2 of the drawings, the juxta-position of the cut away portions 24 holding the sections in interlocked relation. The ends of the contiguous members 20 and 21 are thus disposed in abutting engagement, as in the case of the members 20, or in overlapping engagement as in the case of the members 21, the terminals of said corresponding members 21 being beveled, to permit such overlapping relation, although the members 21 may have terminals cut squarely to permit abutting engagement as in the case of the member 20. When assembling the parts of the hanger, the members 20 of the sections of the hanger are first inserted in the bolster lug 16 and the members 21 disposed with their edges in overlapping relation. The members 21 are then placed in the recess 14 of the brake head which brake head must be previously disengaged from the shoe, the shoe is then inserted in place and lastly the key 13 driven home so as to securely retain the sections of the hanger against separation. It will thus be seen that the sections of a hanger are securely braced against relative movement in any direction. No separate fastening means for the hanger is necessary as in the case of the standard hanger heretofore employed, and it will be seen that it is impossible for the sections of the hanger to become separated or disengaged until the parts of the brake heads are totally separated. The advantages of this form of hanger will readily occur to persons skilled in the art to which this invention appertains. It will moreover be seen that the sections of the hanger may be forged or formed in any similar manner without the use of special machinery, and if desired the cut away portion 24 may be eliminated, the diagonal member 22 being merely formed with a bend at their points of contact.

While we have illustrated and described our invention with some degree of particularity, we realize that in practice various alterations thereover may be made, and we therefore desire to reserve the right and privilege of changing the form of the details of construction, or otherwise altering the arrangement of the correlative parts without departing from the spirit of the invention or the scope of the appended claims.

Having thus described our invention what we claim as new and desire to secure by Letters Patent is:—

1. A brake hanger including a pair of sections each section including parallel members, and a diagonal member connecting the remote ends of said parallel members, said sections being associated with the diagonal members in intersected relation.

2. A brake hanger including a pair of sections, each section formed of a pair of parallel members, and a diagonal member connecting the remote ends thereof, each of said diagonal members having a cut away portion for juxtaposition when the diagonal members are disposed in intersected relation to interlock the sections against relative rotary movement.

3. In combination with a brake head and bolster lug, a hanger including a pair of substantially Z-shaped members designed for association in intersected relation, with their terminals in abutting engagement and one pair of terminals inserted in the bolster head and the other pair in the brake head.

4. In combination with a brake head and bolster lug, a hanger including a pair of substantially Z-shaped members having their diagonal portions cut away for interlocking engagement and their terminals in abutting engagement said terminals being engaged in the bolster lug and brake head.

In testimony whereof we affix our signatures in presence of two witnesses.

CHAS. A. ZWEIBEL.
LEWIS E. ATWELL.

Witnesses:
H. B. Foy,
C. S. Baylor.